April 26, 1932.  W. D. YOUNG  1,855,875
PICK-UP FENDER FOR VEHICLES
Filed June 2, 1931  6 Sheets-Sheet 1
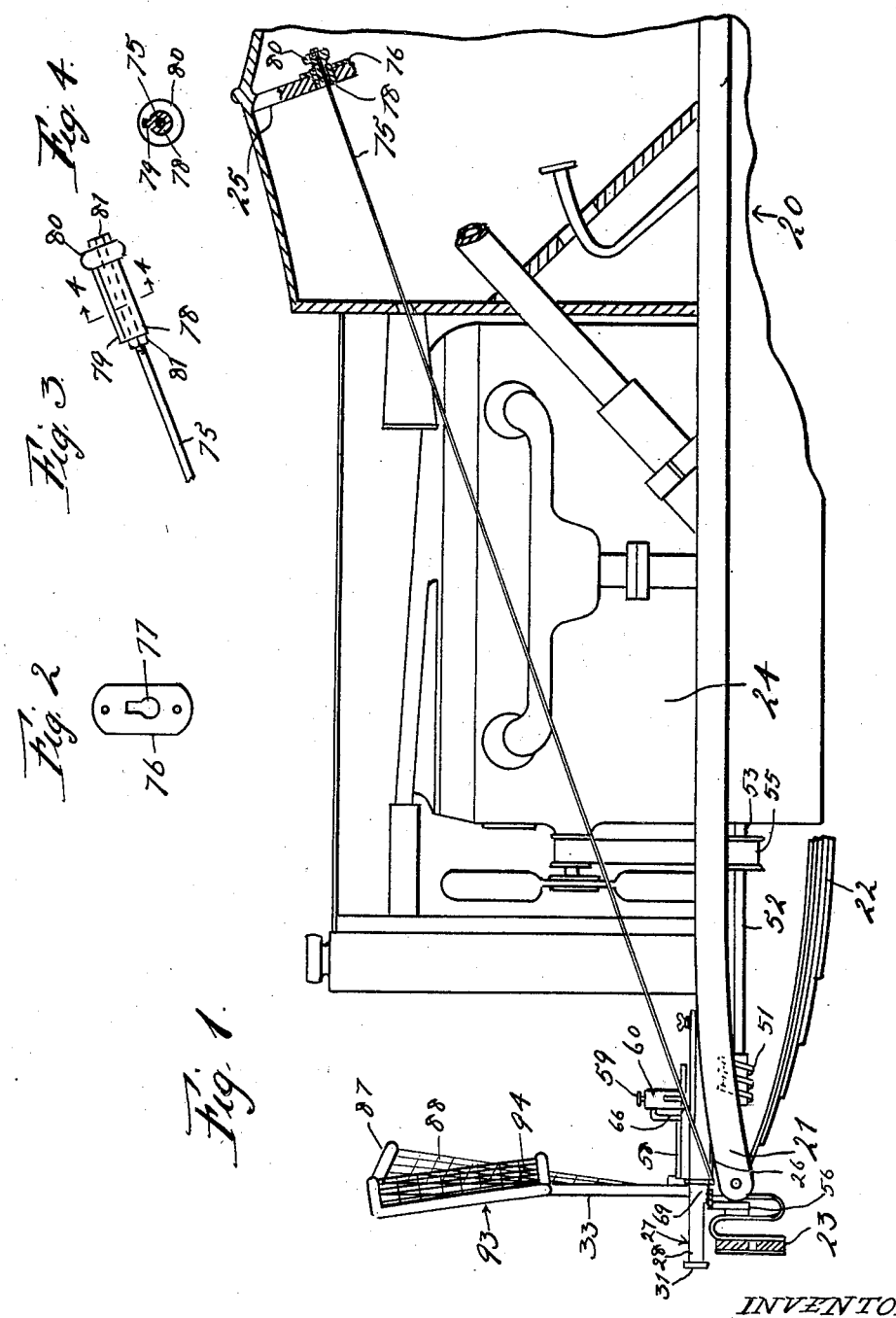
INVENTOR
William D. Young
By
W. W. Williamson
Atty.

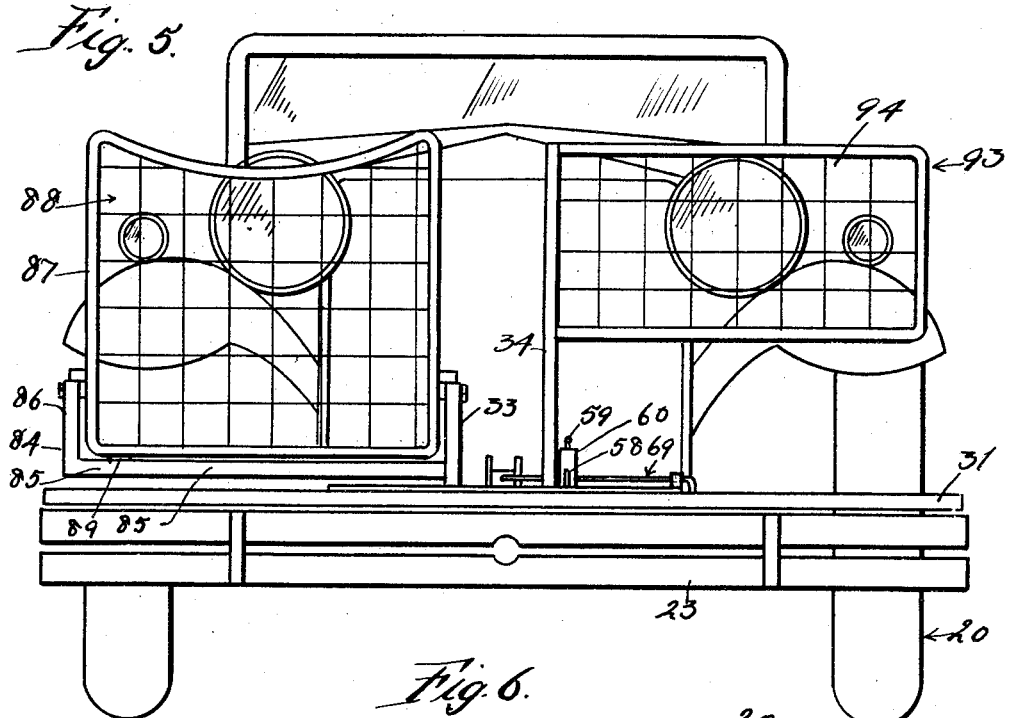
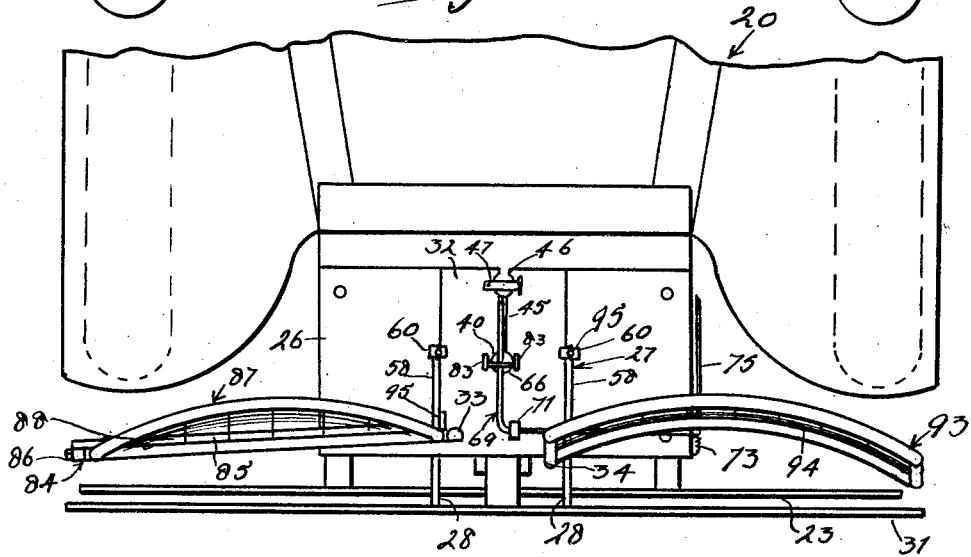

April 26, 1932.   W. D. YOUNG   1,855,875
PICK-UP FENDER FOR VEHICLES
Filed June 2, 1931   6 Sheets-Sheet 3

INVENTOR
William D. Young
By W. W. Williamson
Atty.

April 26, 1932.   W. D. YOUNG   1,855,875
PICK-UP FENDER FOR VEHICLES
Filed June 2, 1931   6 Sheets-Sheet 4

INVENTOR
William D. Young
By W. W. Williamson
Atty.

April 26, 1932.  W. D. YOUNG  1,855,875
PICK-UP FENDER FOR VEHICLES
Filed June 2, 1931  6 Sheets-Sheet 5
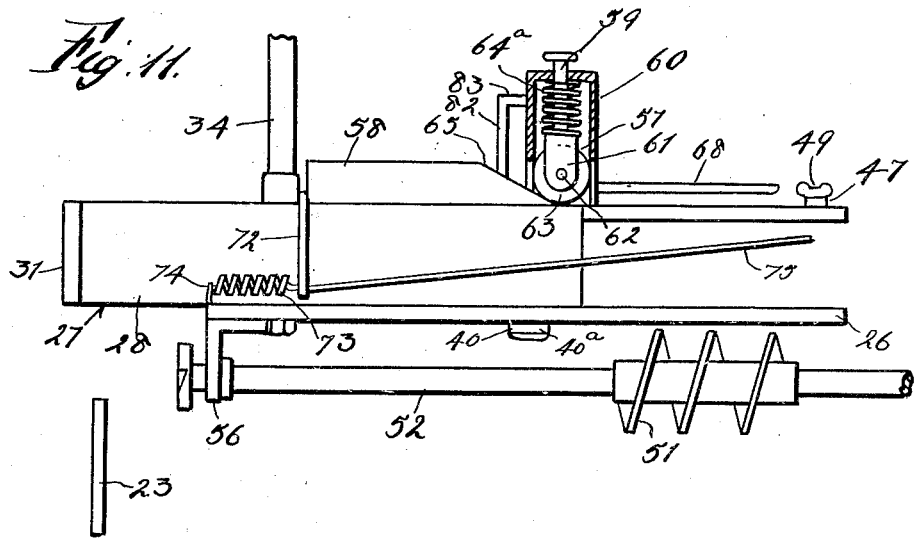
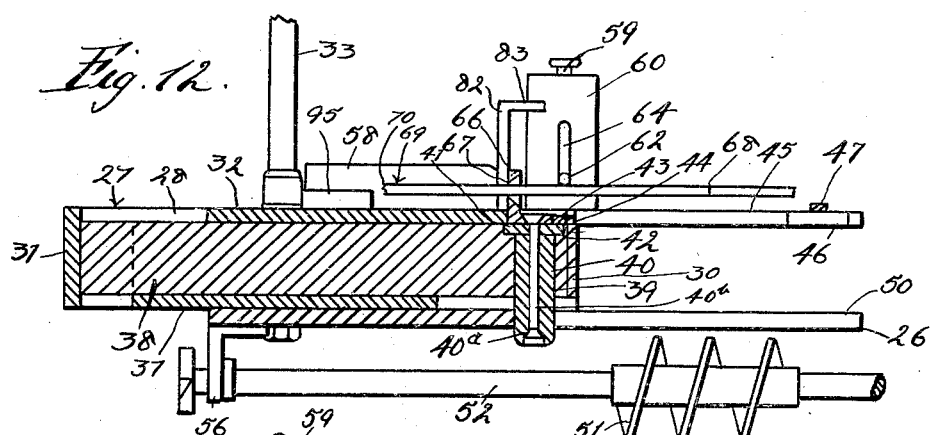
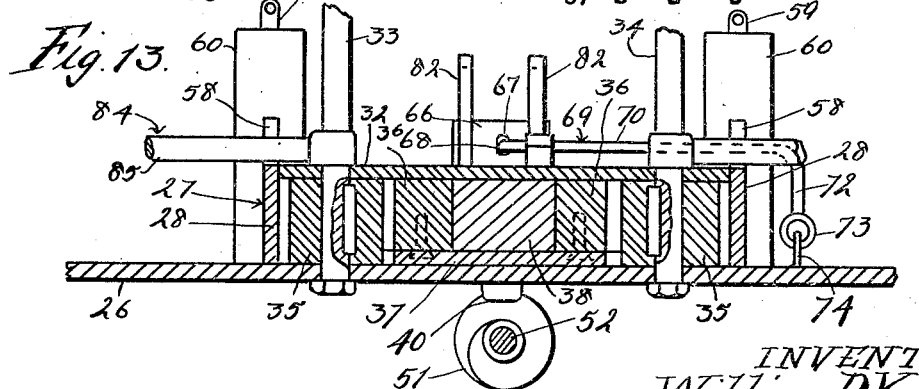
INVENTOR
William D. Young
By W. W. Williamson
Atty.

April 26, 1932.  W. D. YOUNG  1,855,875
PICK-UP FENDER FOR VEHICLES
Filed June 2, 1931   6 Sheets-Sheet 6

INVENTOR
William D. Young
By H. W. Williamson
Atty.

Patented Apr. 26, 1932

1,855,875

UNITED STATES PATENT OFFICE

WILLIAM D. YOUNG, OF ROSLYN, PENNSYLVANIA

PICK-UP FENDER FOR VEHICLES

Application filed June 2, 1931. Serial No. 541,591.

My invention relates to new and useful improvements in a pick-up fender for vehicles and has for one of its objects to provide a device of this character which is especially adapted for use in connection with automobiles either of the pleasure car or truck type.

Another object of the invention is to provide means for picking-up and holding a person when struck thereby in order to prevent such person from being thrown down directly in front of the vehicle or off to one side possibly in front of another vehicle.

Another object of the invention is to provide means for automatically operating the fender after being initially started due to the force of impact incident to striking an object, especially a person.

Another object of the invention is to provide means under the control of the vehicle operator whereby the main functions of the fender may be forestalled when it becomes apparent that an object other than a person is to be hit by the fender.

Another object of the invention is to provide means for transmitting motion from the engine or motor of the vehicle to a part of the fender which will cause the gripping or holding elements of said fender to operate.

A further object of the invention is to provide holding or gripping means of unique construction and arrangement whereby a person who is struck will be forced into the fender in such position that the person cannot be dropped.

Another object of the invention is to provide means for preventing the holding or gripping means from accidentally assuming undesired positions when the fender is inoperative and particularly while the vehicle is travelling.

A further object of the invention is to provide means for holding parts of the fender in their inoperative or set positions after the fender has been initially operated but the functions have not been completed.

A still further object of the invention is to so mount, install or assemble the fender on a vehicle that if the fender comes in contact with another vehicle or similar object a sliding part of said fender will recede to permit contact with the vehicle bumper with some part of the other vehicle without the fender gripping or holding means being actuated.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a fragmentary conventional illustration of an automobile with the hood removed and portions shown in section illustrating my pick-up fender applied thereto.

Fig. 2 is an enlarged face view of the escutcheon with which the sleeve on the pin operating rod coacts.

Fig. 3 is an enlarged side elevation of the sleeve which is swiveled on the pin operating rod.

Fig. 4 is a section on the line 4—4 of Fig. 3.

Fig. 5 is a front elevation of an automobile illustrating an application of my invention with the fender wings open or in the positions assumed under ordinary operating conditions.

Fig. 6 is a top plan view thereof with the rear part of the automobile broken away.

Fig. 11 is a side elevation of Fig. 9.

Fig. 12 is a section on the line 12—12 of Fig. 9.

Fig. 13 is a section on the line 13—13 of Fig. 9.

Figure 7:
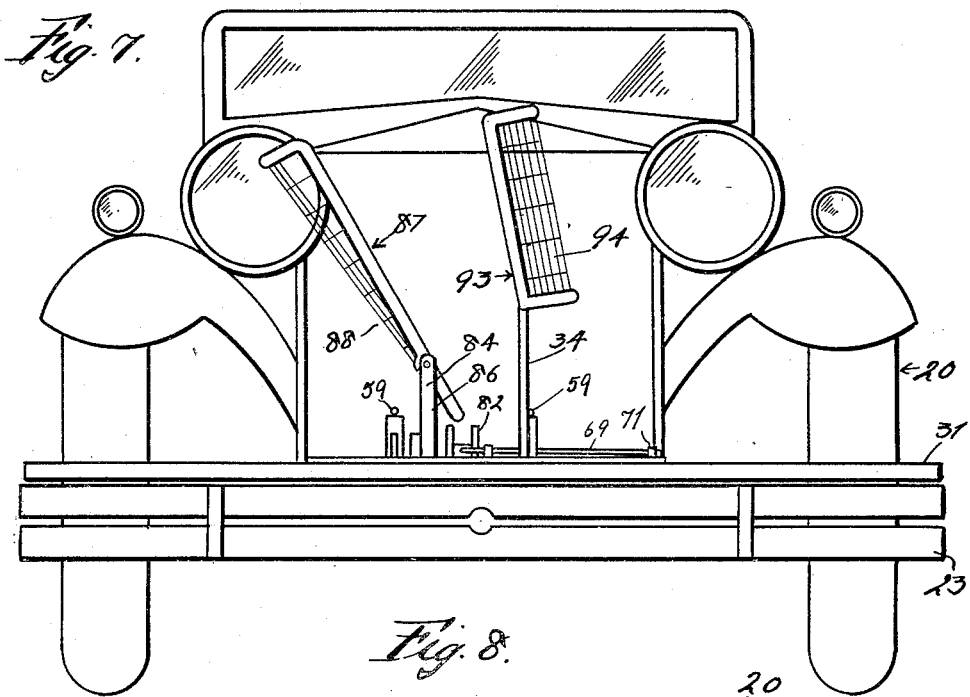
Fig. 7 is a front elevation of an automobile showing the fender wings in position after operation or illustrating them in the positions assumed after being operated due to the fender striking a person.

In carrying out my invention as herein embodied, 20 represents an automobile including the extensions 21 of the chassis side pieces to which the front springs 22 are connected and which may also support a bumper 23. Likewise, the automobile includes a motor 24 and an instrument board 25 or the equivalent thereof.

My pick-up fender is supported at the front of the automobile preferably upon the extensions 21 of the chassis side pieces by means of a base plate 26 extending between the two extensions or in any way suitably fastened to the automobile. On the base plate is slidably mounted the actuator frame 27 including two side pieces or slides 28 held in line by sliding contact with the guide blocks 29 carried by the base plate 26 and preferably located adjacent the forward edge of the latter and said slides 28 are held in parallel relation by the rear cross bar 30, which is preferably of slightly less height than the slides 28 or in other words, the upper edge of the rear cross bar 30 is on the same level as the blocks 29, and by the pusher bar 31 at the forward end of the slides 28, which, under ordinary conditions or when the automobile is being regularly operated, projects beyond the bumper 23 as shown in Figs. 1 and 6, and indicated in Fig. 11.

On top of the blocks is mounted a cover plate 32 and rests between the slides 28 of the actuator frame and overlies the rear cross bar 30 so that said cover plate acts, in conjunction with the blocks 29, as a further guide for the actuator frame 27.

At each side of the device and preferably inside of the slides 28 are journalled for rotation a pair of posts or standards 33 and 34 preferably having their bearings in the base and cover plates 26 and 32 respectively. On said standards or posts are fixed suitable gears 35, segmental or otherwise, each meshing a rack 36 movable as a single unit due to connection therewith of the connecting plate 37. Between these racks is slidably mounted the draw bar 38 which is connected with the rear cross bar 30 and the pusher 31 and therefore also forms a part of the actuator frame.

The draw bar 38 is provided with a vertical hole 39 in which is removably and slidably mounted a pin 40 which includes a roller 40a journalled on an axle 40b provided with a head 41 for registration with the enlargement or counter sink 42 of the hole 39 so that said head may pass through an opening 43 in the cover plate 32 and rest in the counter sink below the cover plate permitting the pin to move with the draw bar underneath the cover plate and in order to prevent rotation of only the axle portion of said pin, a head extension 44 is provided which registers with and runs in a slot 45 in the cover plate, and near the rear edge of said cover plate the latter is provided with another opening 46 similar to the opening 43 to permit withdrawal of the pin 41 under some conditions but said pin ordinarily is prevented from withdrawal through the opening 46 by means of a latch 47 having one end pivoted as at 48 and the other end provided with a thumb screw 49 having threaded connection with the cover plate 32 whereby said latch may be removably held in place across the opening 46.

The pin 40 is of sufficient length to extend through the draw bar and some distance below the base plate 26 through a slot 50 in said base plate whereby when the draw bar is moved rearwardly a sufficient distance the pin 40 may be engaged by a worm 51 mounted on the worm shaft 52, Figs. 1, 11, 12, 13, and 17, which is connected to the forwardly projecting end of the engine shaft 53 as by a sleeve 54 having threaded connection with both shafts and if found desirable this sleeve may carry the fan belt pulley 55.

In connecting the worm shaft with the engine shaft, the starting crank key is removed from the end of the engine shaft and the latter then prepared for the reception of the sleeve 54 and the starting crank key is placed at the outer end of the worm shaft 52 and said worm shaft may be held in proper alignment and supported by a bracket 56 depending from the base plate 26. The engine being in operation whenever the parts of the fender are actuated to move the pin 40 into position for engagement by the worm 51, the latter will immediately move the pin and associated parts rearwardly with considerable velocity.

Upon completion of the rearward movement of the pin and at the end of the movements of the other parts, the pin 40 will be actually disengaged from the worm or will have run out beyond the same and may be temporarily held in such positions by means of the spring bolts 57 dropping in front to the stop cams 58 carried by the actuator frame. Each of the spring bolts, one or more being used, comprises a rod 59 preferably slidably mounted through the top of a bolt housing 60 and having a yoke or fork 61 at its lower end to form bearings for the axle 62 of a wheel or roller 63, the ends of the axle preferably acting as guide means and sliding in slots 64 in the housing 60 although other suitable equivalent guide means can be provided. The housing is so constructed that a portion of it may be connected with the base plate 26 and another portion with the cover plate 32 with an opening through which one of the slides 28 of the actuator frame and its associated cam stop 58 passes whereby the upper edge of the slide and the stop cams may be engaged by the roller or wheel 63 on the spring bolt which includes a spring 64a to normally force the spring bolt toward the slide and stop cam. The stop cam includes an inclined or cam surface 65 toward the rear end which must be sufficiently steep to cause the actuator frame to be moved forward due to the force exerted by the spring bolts on the cam surfaces from the springs.

As will be presently described, it is some times desirable to prevent the worm 51 from operating the fender structure in which case I have provided the pin 40 with an ear 66 in which there is an aperture 67 for registration with the tail end 68 of a lever 69, said tail end being of sufficient length to remain in engagement with the ear 66 throughout the entire movement of the pin. The lever 69 also includes an intermediate portion 70 suitably journalled in bearings 71 on the cover plate 32 which is stationary and likewise said lever includes a pendant portion 72, the movement of which will rotate the central portion 70 and thus raise or lower the tail piece 68. The tail piece is normally maintained in a depressed or lowered position by a spring 73 connected with the pendant part 72 and suitably anchored as at 74 and said tail piece or end may be elevated by means of a connecting rod 75 having one end attached to the pendant portion 72 of the lever 69 and running to a location which is convenient to access by the operator of the automobile. Preferably said connecting rod projects through an instrument board 25 or the equivalent thereof on which is mounted an escutcheon 76 provided with a key hole 77 in which is slidably mounted a spline sleeve 78, which sleeve is swiveled or rotatably mounted on the connecting rod 75 and said sleeve has a portion that will pass through the curved part of the key hole 77 and also a spline or rib 79 which will fit the rectangular part of the key hole 77 and said sleeve may be provided with a head or finger piece 80 by which said sleeve may be readily rotated.

The sleeve being mounted upon the connecting rod 75 it is located between nuts 81 or equivalent means locating and holding it on the rear end of the connecting rod while permitting it to rotate on said connecting rod. Ordinarily the sleeve may be moved in and out through the key hole 77 for lifting the pin 40 and then permitting it to drop back into place but when it is desirable to temporarily maintain the pin in a raised position the sleeve 78 can be entirely withdrawn from the escutcheon 76 and then rotated until its spline or rib is out of alignment with the rectangular part of the key hole 77 and therefore the tail piece of the lever 69 will remain elevated and hold the pin 40 in a raised position out of line with the worm 51. In order to prevent the tendency to move the upper end of the pin 40 forwardly as it is withdrawn by the lever and the subsequent binding of the pin on the wall of its socket or hole 39 and to prevent too great an elevation, I provide guides or backers 82 having right angled upper ends 83 in the path of travel of the ear 66.

The upright or standard 33 is a part of a wing frame 84, Figs. 5 to 8 inclusive and 14, which in addition to the upright includes a reach bar 85 and a short upstanding arm 86 and said wing frame will be rotated whenever the gear 35 on the standard or upright 33 is moved by its rack.

Figure 15:
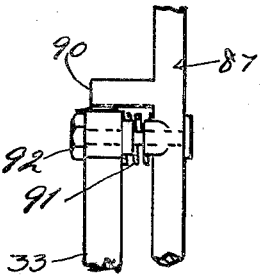
Fig. 15 is an enlarged fragmentary detail elevation of one of the connections between the net frame and the wing frame.
Figure 16:
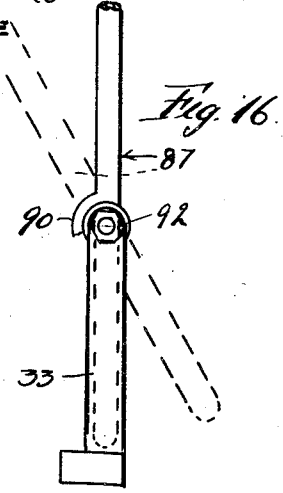
Fig. 16 is an edge view of Fig. 15.
Figure 17:
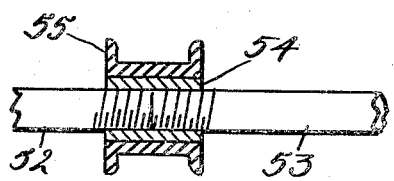
Fig. 17 is an enlarged view partly in elevation and partly in section to illustrate the connection of the worm shaft and the engine shaft.

In the upper ends of the standard 33 and short arm 86 is swingingly mounted or journalled a net frame 87 and the top bar of this net frame is curved as shown so that when the netting 88 or equivalent material is mounted thereon, said netting will have a certain curvature to function somewhat like a cradle or hammock. In order to limit the swinging movement of the net frame in one direction a stop 89 projects from the reach bar 85 into the path of travel of the lower bar of said net frame and to also limit the movement of said net frame in the opposite direction, the latter is provided with curved stop fingers 90 which partially encircle the bearings at the upper ends of the standard 33 and short arm 86 and will engage said standard and arm when thrown back as indicated by dotted lines in Fig. 16. To prevent undue accidental movement of the net frame spring washers 91 are placed over its journals between said net frame and the wing frame as shown in Fig. 15 and the tension thereof may be regulated in any well known manner as by nuts 92 mounted on the journals.

Figure 8:
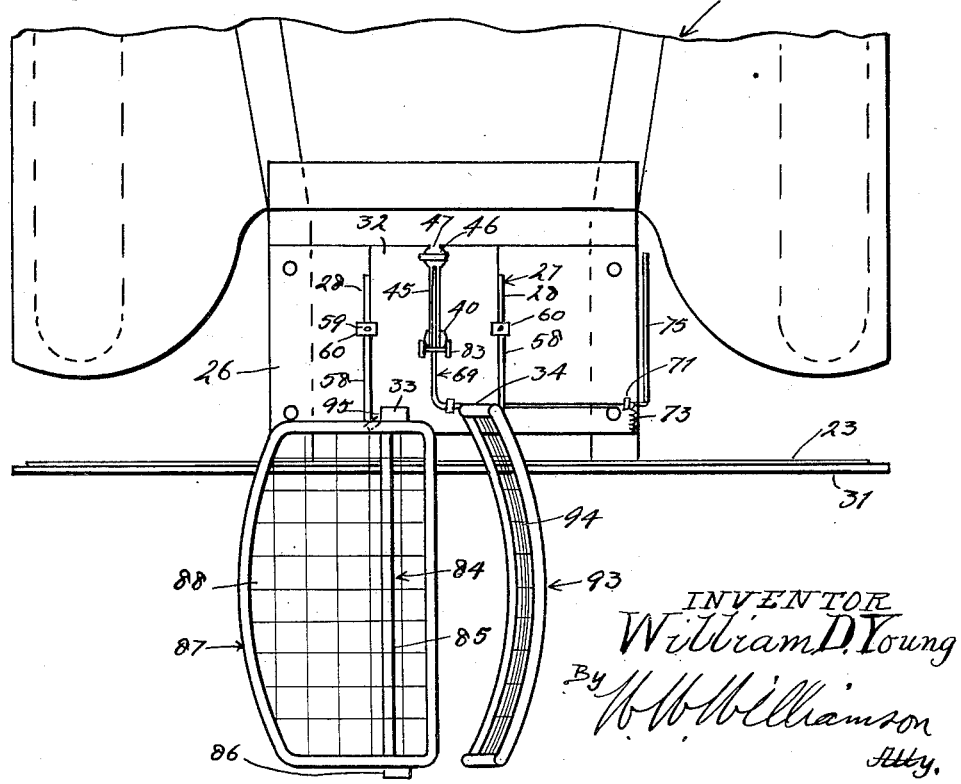
Fig. 8 is a top plan view thereof with the rear part of the automobile broken away.
Figure 9:
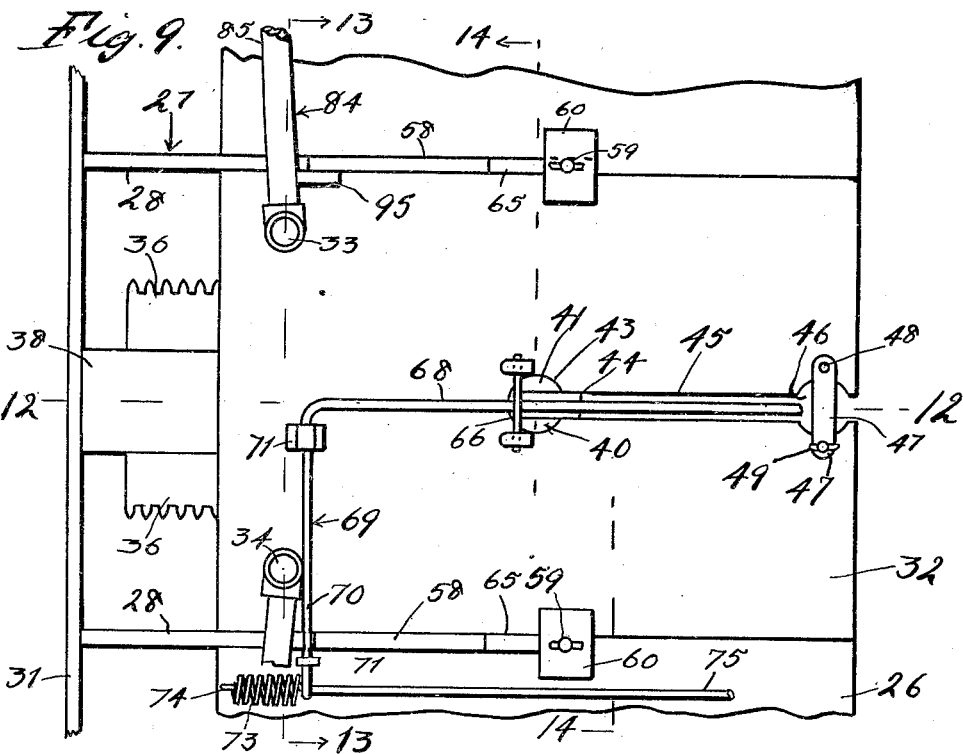
Fig. 9 is an enlarged plan view of the fender per se with parts of the supporting plate, fender wings and push bar broken away.
Figure 10:
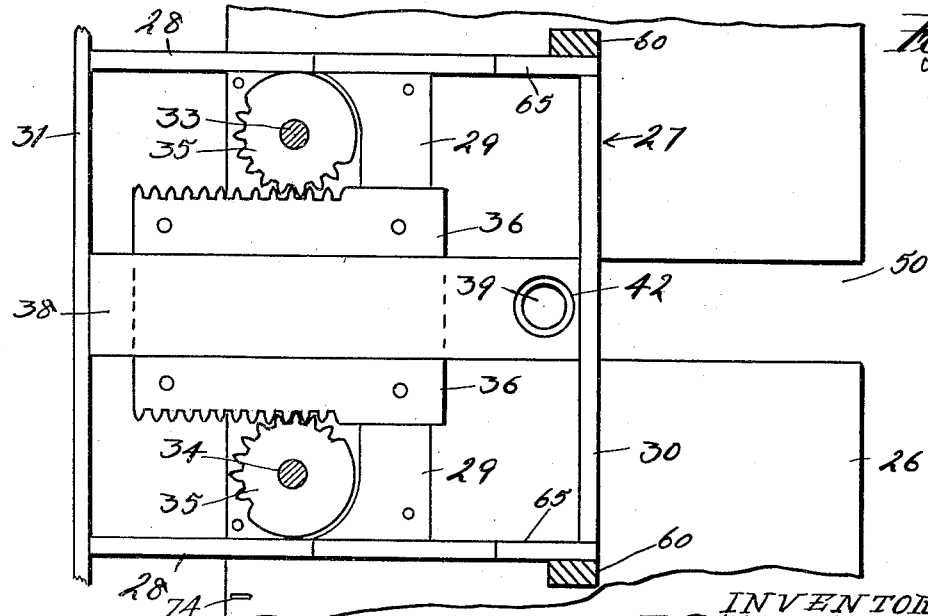
Fig. 10 is a similar view with the cover plate and component parts as well as the fender wings removed.
Figure 14:
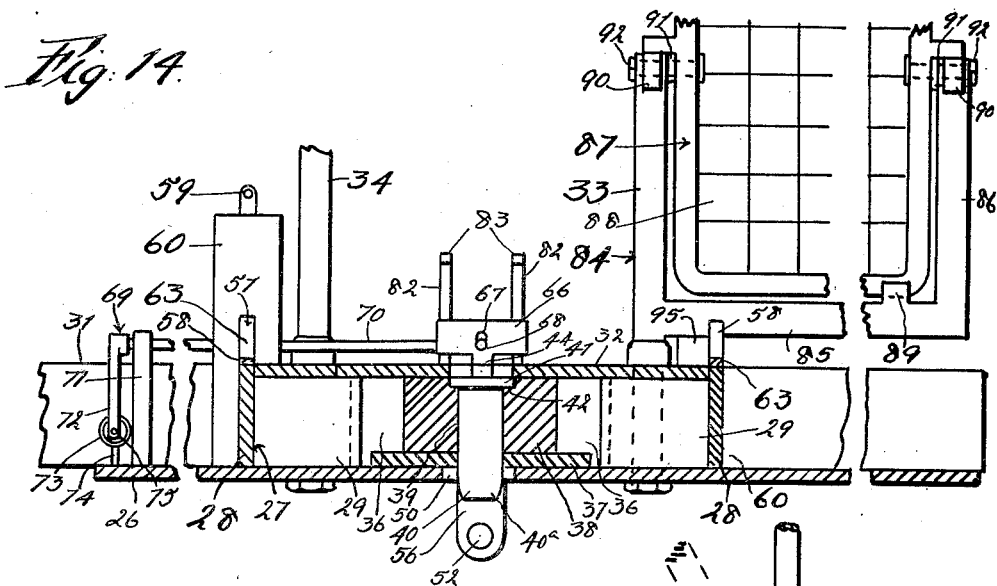
Fig. 14 is a section on the line 14—14 of Fig. 9.

The upright or standard 34 forms a part of the combined wing and net frame 93, the wing of which is preferably located above the journal line of the net frame 87 and the top and bottom bars of said combined wing and net frame are curved as plainly shown in Figs. 6 and 8, and said frame has suitable netting 94 or its equivalent disposed thereon.

From the foregoing description, it will be noted that under ordinary operating conditions the fender nets or wings are in opposed or oppositely projecting directions straight across the front of the automobile or at right angles to its center line and the pusher rod 31 of the actuator frame 27 is disposed ahead of the automobile bumper as illustrated in Figs. 1, 6 and 11.

The wing frame 84 is provided with a rearwardly projecting holding extension 95 which when on the inside of the adjacent stop cam 58 or in engagement with the inner surface of said stop cam prevents the wings which are connected through the racks and gears, from being accidentally rotated forwardly due to wind pressures or otherwise, and if found desirable, the said stop cam may be so located on the slide 28 as to prevent rearward swinging movement of said wings beyond their normal set positions although parts of the automobile will also function to prevent rearward swinging movement of said wings.

When the operator becomes aware of the fact that his vehicle will strike another vehicle or some other inanimate object, the sleeve 78 should be withdrawn from the escutcheon 76 so as to elevate the pin 40 to prevent it meshing with the worm 51 as the actuator frame is forced rearwardly. This will permit the bumper 23 of the vehicle to absorb the shock incident to striking the inanimate object. The rearward movement of the actuator frame causes the spring bolts 57 to ride up on the cam surfaces 65 so that when pressure is relieved from the pusher bar 31 the spring bolts acting upon the cam surfaces will cause the actuator frame to again move forwardly. It should also be noted that the movement of the actuator frame back to the same vertical plane as that of the vehicle bumper is not sufficient to disengage the stop cams from the holding arms 95 and therefore the fender wings cannot be operated.

Should the vehicle equipped with such a fender strike a person, the force of the compact will move the actuator frame rearwardly until the pin 40, which is left in its normal position, will mesh with the worm 51, which is being constantly revolved, and therefore quickly draw the actuator frame and component parts rearwardly, moving the racks 36 therewith due to engagement of the pusher bar 31 with the outer ends of said racks which will transmit motion through the gears 35 to the uprights or standards 33 and 34 thereby swinging the fender wings around to positions lengthwise of the automobile as shown in Figs. 7 and 8. The wing including the frame 93 will throw the person to one side against the wing including the frame 87 and because the frame 87 is swingingly mounted on a horizontal axis, the latter will be tilted as shown in Fig. 7, so as to support the person in suspended condition.

The height of the fender wings is such that the upper bars or parts of the wings are likely to catch a grown person of average statue under the arm pits and since most persons have a habit of throwing their arms in the air when about to be struck by a vehicle, it is quite likely that even small persons, such as children, will be caught under the arm pits but this is not essential since the space at the bottom of the fender wings can be small enough to prevent the body of a person from dropping out although the legs can protrude.

After a person has been picked up by the fender and the vehicle has been brought to a stand-still, the pin 40 can be withdrawn through the opening 46 by throwing back the latch 47 and then lifting the spring bolts 57 and finally moving the actuator frame forward or rotating the fender wings which will move the actuator frame forward. After the person has been released, the pin 40 is again inserted in the hole 39 through the opening 43.

The parts of the fender which come in contact with a person, especially the wing frames, are enclosed by inflatable or other suitable soft coverings.

Of course, I do not wish to be limited to the exact details of construction herein shown and described as these may be varied within the limits of the appended claims without departing from the spirit of my invention.

Having thus fully described my invention, what I claim as new and useful is:—

1. A pick-up fender for vehicles including a pair of wings rotatable in horizontal planes toward each other, and means for rotating said wings and having an initial free movement during which time no motion is imparted to the wings.

2. The structure set forth in claim 1, in combination with means for returning the actuating means to its normal position upon completion of the initial portion of the movement whenever the complete movement is not carried out.

3. A pick-up fender for vehicles including a pair of wings rotatable toward each other, mechanism capable of rotating the fender wings and carrying a withdrawable pin, and a worm in the path of travel of said pin which when meshing with said pin will operate the mechanism and to rotate the fender wings.

4. The structure set forth in claim 3, in combination with means to permit manual withdrawal of the pin to prevent operation of the mechanism by the worm.

5. In a fender of the class described a pair of wings rotatable in horizontal planes toward each other, one of said wings being inclined forwardly and the other of said wings including a tiltable element, and means to rotate said wings when a portion of said means contacts with an object.

6. The structure set forth in claim 5, in combination with means to limit the tilting movement of the tiltable element, and means to produce a tension on said tiltable element.

7. In a device of the kind described, the combination with a vehicle including a motor and a bumper, a base plate mounted on the front of said vehicle to the rear of the bumper, an actuator frame slidably mounted on said base plate, said actuator frame including a pusher rod normally disposed in front of the vehicle bumper, a draw bar having a hole therethrough with a counter sink at its upper end, a cover plate disposed over the rear portion of the actuator frame and extending rearwardly thereof and provided with a pair of spaced openings connected by a slot, a pin removably mounted in the hole of the draw bar, a head on said pin for registration with the counter sink so that said head will assume a position below the cover plate, an extension on the pin head of a shape to fit the slot in said cover plate and prevent rotation of the pin, racks slidably mounted between the base plate and the cover plate and movable in one direction after the pusher bar engages therewith, fender wings journalled in the base and cover plates for horizontal lines toward each other, gears connected with said fender wings and meshing with the racks whereby movement of said racks will rotate the fender wings and a worm revolved by the vehicle motor, said worm being in the path of travel of the pin so that when meshing therewith it will move the actuator frame rearwardly to operate the fender wings.

8. The structure set forth in claim 7, in combination with stop cam structures on the actuator frame, spring bolts coacting with the stop cam structures to return the actuator frame to its normal set position when moved a shorter distance than is required to move the pin into mesh with the worm or said pin has been withdrawn, said spring bolts also coacting with the outer ends of the stop cam structures to hold the actuator frame in its rearward position after actuation by the worm and with the fender wings in their holding position, means carried by the fender wings and cooperating with the stop cam structures to prevent rotation of the fender wings until the stop cam structures have been retracted by the initial movement of the actuator frame, means capable of being manually operated for withdrawing the pin at the will of the operator and means to maintain said pin in its withdrawn position.

In testimony whereof, I have hereunto affixed my signature.

WILLIAM D. YOUNG.